United States Patent Office 2,749,707
Patented June 12, 1956

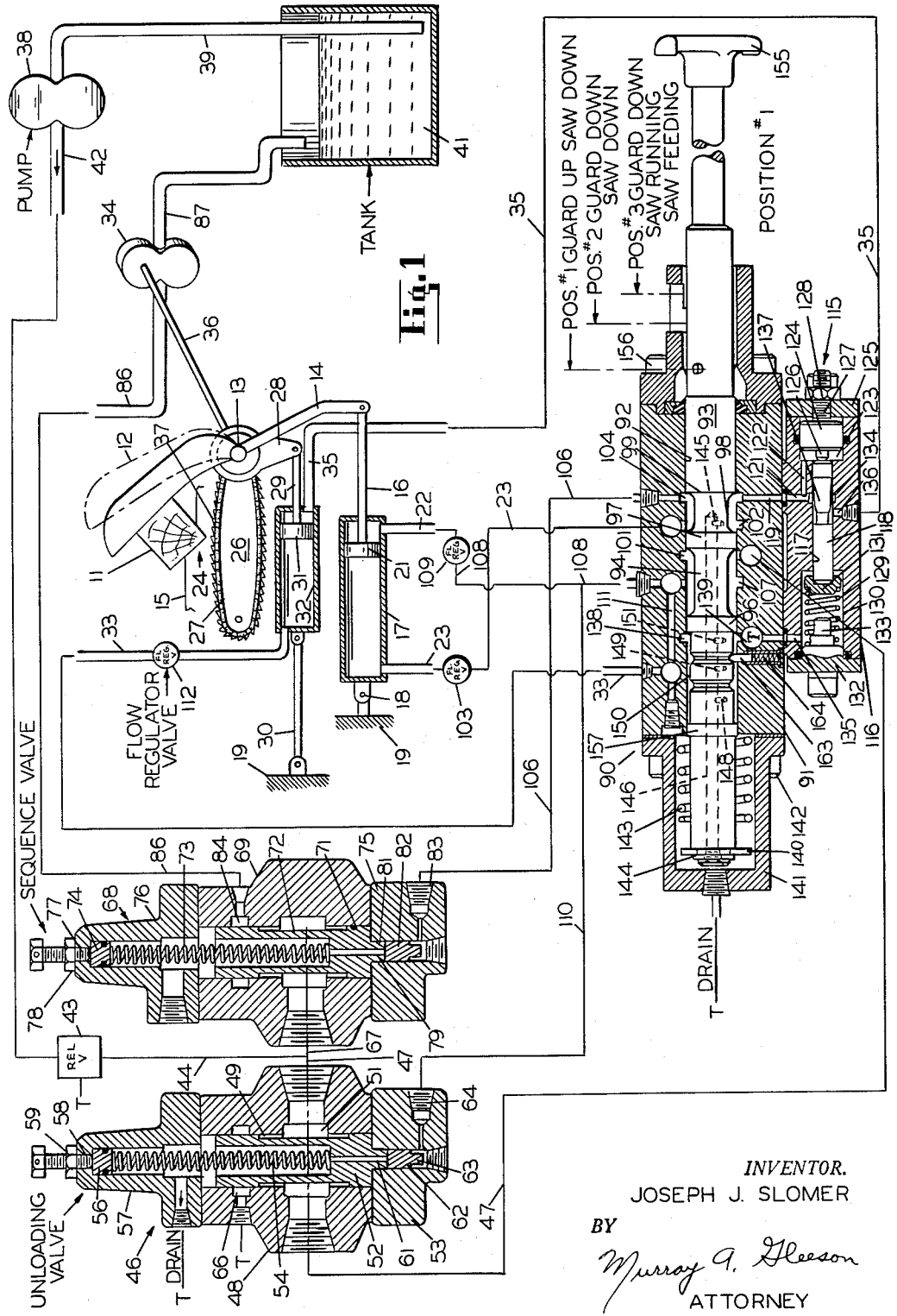

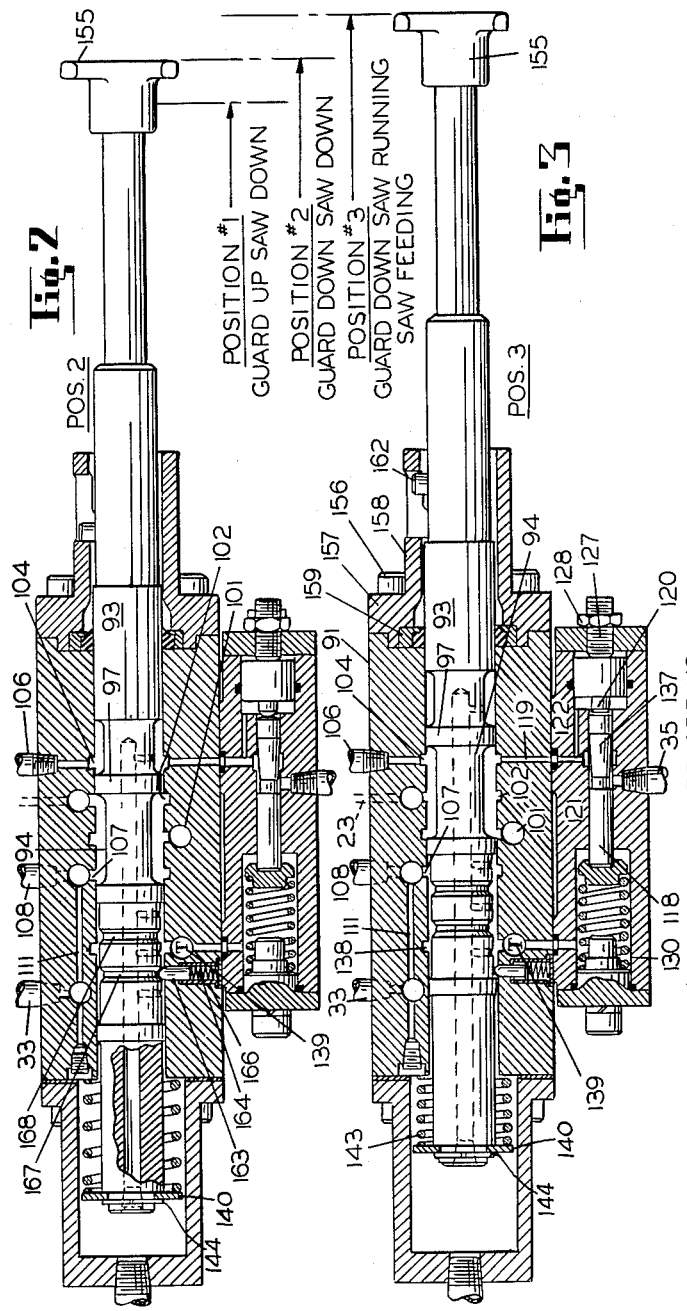
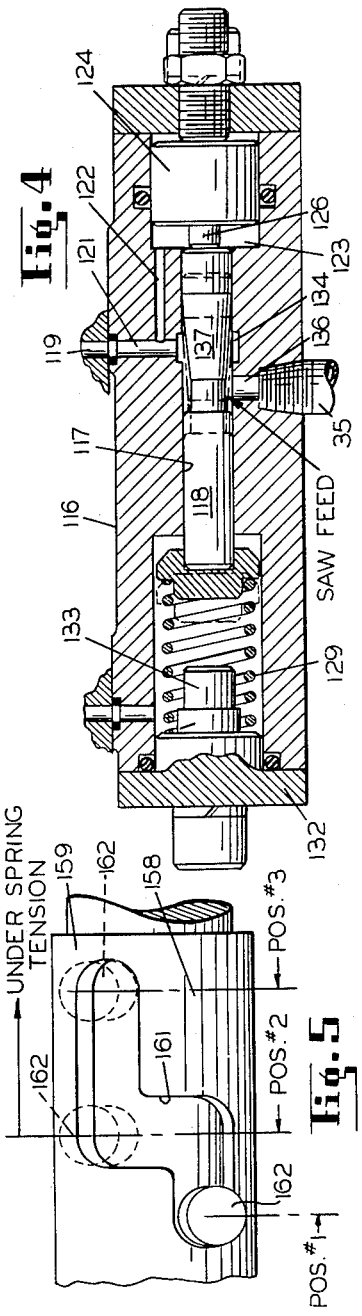

2,749,707

HYDRAULIC MOTOR CIRCUIT FOR CUT-OFF DEVICE OR THE LIKE

Joseph J. Slomer, Chicago, Ill., assignor to Goodman Manufacturing Company, Chicago, Ill., a corporation of Illinois Application April 22, 1952, Serial No. 283,529

6 Claims. (Cl. 60—52)

This invention relates generally to machines for controlling the sequence of operations in sawing timbers, mine props or the like, and relates more particularly to a control system for such machines.

This invention represents an improvement over the invention disclosed in my co-pending application Serial No. 242,394, filed August 17, 1951, for Timbering Machine.

Broadly considered, the timbering machine according to the present invention may be considered to embrace apparatus for performing the following functions. One, the actuation of a control valve to a first position for retracting the saw guard and saw, the pressure in a hydraulic system controlled by the valve during such operation being at a minimum; two, actuation of the valve to a second position to lower the saw guard and clamp the work piece, the saw continuing to remain in retracted position, and the pressure in the hydraulic system continuing at such minimum; and three, actuation of the control valve to a third position to operate the saw motor and the saw feed means to move the saw against the work piece, the pressure in the hydraulic system during such last operations only being required to be a maximum. During such last operations of the saw feed means and the saw motor, a saw feed control valve is made operative automatically to regulate the rate of saw feed in accordance with the amount of resistance encountered by the saw.

It is a principal object of this invention to provide an improved timbering machine and more particularly an improved hydraulic system and control valve therefor.

Another object is to afford a hydraulic system for such a timbering machine wherein the operations of raising and lowering the saw guard and retraction of the saw guard are accomplished by the no load back pressure against a pump connected in the hydraulic system, and wherein pressure fluid at higher working pressures is required only for the operations of driving the saw motor and feeding the saw into the work.

Still another object is to provide a timbering machine having a hydraulic system therefor for causing a desired set of sequential operations, and wherein the rate of feed movement of the saw will be automatically adjusted in accordance with the resistance encountered thereby.

Yet another object is to hold the saw guard of such a timbering machine in position clamping a work piece, in such a fashion that the clamping engagement will be increased as the resistance to feed movement of the saw increases.

Other objects and important features of the invention will be apparent from a study of the specification following taken with the drawings which together illustrate a preferred embodiment of the invention and what is now considered to be the best mode of applying the principles thereof. Other embodiments of the invention will be suggested to those having the benefit of the teachings herein, and it is therefore intended that the invention be limited only by the scope and purview of the claims subjoined.

In the drawings:

Figure 1 is a general schematic view of a timbering machine according to the present invention, the control valve, relief and sequence valves therefor being shown in longitudinal section, the control valve being shown in position for raising of the saw guard and retraction of the saw;

Fig. 2 is an enlarged longitudinal sectional view through the control valve shown in Fig. 1, the valve being in position for lowering of the saw guard to clamp a timber into place, the saw meanwhile being maintained in retracted position;

Fig. 3 is a view similar to Fig. 2 showing the control valve in position for clamping by the saw guard of a mine timber and for operation of the saw motor and for feed movement of the saw against the timber;

Fig. 4 is an enlarged longitudinal section through a saw feed control valve shown also in conjunction with the control valve shown in Figs. 1, 2 and 3; and Fig. 5 is a plan view of a bayonet slot and locking pin for holding the control valve in selected positions.

Referring now to the drawings, the present invention is described in connection with a saw bench 15 for a mine timber 11 adapted to be held in clamped position by a saw guard 12. The location of the saw bench 15 with respect to a mine vehicle for loading, cutting and installing mine timbers may be that as more specifically disclosed in Letters Patent of George W. Miller for a Mine Timbering Machine Having a Timber Cutting Unit, Patent No. 2,683,475, issued July 13, 1954. The saw guard 12 is mounted to pivot about a shaft 13 and is rocked to and from clamping position by a first fluid operated motor including a rock arm 14 pivotally connected to a piston rod 16 of a double acting hydraulic cylinder 17 pivoted at 18 to any convenient abutment 19 of the aforesaid mine vehicle. The piston rod 16 has a piston 21 thereon which is slidable with the piston rod 16 within the cylinder 17. Fluid conduits 22 and 23 connected respectively to opposite ends of the cylinder 17 furnish pressure fluid so that the piston 21 and piston rod 16 may be moved in desired directions under conditions as will appear as this specification proceeds.

The mine timber 11 is disposed over a slot 24 formed in the saw bench 15, as may be more clearly shown in the aforesaid application, and a chain type saw 26 is adapted to move about the shaft 13 in a clockwise direction against the mine timber 11 to saw the same. The exact form of the saw 26 forms no part of the present invention and it is contemplated also that the saw 26 may be of the circular type, such a form being within the scope of the present invention. Irrespective of whether the saw 26 is circular or of the chain type, it is driven by a second fluid operated motor 34 connected thereto by a drive shaft 36. The chain saw 26 includes a frame 27 co-acting with a rock arm 28 adapted to turn on the shaft 13. The rock arm 28 is part of a third fluid operated motor and is hingedly connected to a piston rod 29 having a piston 31 thereon slidable in a double acting hydraulic cylinder 32 pivoted to a link 30 which in turn is pivoted to the abutment 19. Pressure fluid is directed against the piston 31 within the cylinder 32 by fluid conduits 33 and 35 connected respectively to opposite ends of the cylinder 32.

Power for driving the saw 26 is derived from the fluid operated motor 34 connected by the shaft 36 to a gear train, not shown, which in turn drives cutter teeth 37 of the saw 26.

Fluid under pressure is provided for the system shown in Fig. 1 to drive the saw motor 34 and actuate the pistons 21 and 31 and their respectively operated saw guard 12 and saw 26. The system thus includes a pump 38 connected by an intake line 39 to a reservoir 41 of hydraulic fluid. The output from the pump 38 is connected to a pressure line 42 having a relief valve 43 therein which may be set to relieve pressure fluid to tank 41 when the pressure in line 42 reaches for example, a value in excess of 800 p. s. i.

The fluid under pressure passes relief valve 43 to a pressure line 44. A pilot operated unloading valve indicated generally by the reference numeral 46 is connected in a pressure line 47 branching from pressure line 44. The unloading valve 46 includes a valve body 48 having a bore 49 therein which is intersected by a port 51 connected to the pressure line 47. A hollow spool valve number 52 is slidable in the bore 49, and is urged by a spring 54 against an end cap 53 secured to the valve body 48 by screws, not shown. The spring 54 is bottomed at one end within the hollow spool 52 and at the other end against an adjustable abutment 56 held in an opposite end cap 57 held to the other end of the valve body 48 in any convenient manner. The spring 54 is adjusted in its load by an adjusting member 58 threaded into the end cap 57 locked in position by a locking nut 59.

The hollow spool valve member 52 has a pilot extension 61 which slides in a bore 62 in the end cap 53. A pilot piston 63 bears against the pilot extension 61 and is subjected to pressure at a pilot operating port 64. Under conditions when pressure at the port is in excess of a desired value, as will be described in more detail as this specification proceeds, the spool valve 52 is moved against the force of spring 54 to unlap a tank port 66, so that the valve 46 will unload fluid from port 51 to the tank port 66.

The pressure line 44 has branching therefrom a pressure line 67 connected to a sequence valve indicated generally by the reference numeral 68. The sequence valve 68 is similar to the construction of the pilot operated unloading valve 46, and includes a valve body 69 having a cylindrical bore 71 therein. A hollow spool valve member 72 is slidable within the bore 71 and is urged by a spring 73 against an end cap secured to the valve body 69 in any convenient manner. The spring 73 is bottomed at one end within the hollow spool 72 and at the other end against an adjustable abutment 74 held in an opposite end cap 76 also secured to the valve body 69 in any convenient manner. The load in the spring 73 is adjusted by a member 77 threaded into the end cap 76 and locked in position by a locking nut 78.

The hollow spool member 72 has a pilot extension 79 which slides in a bore 81 formed in the end cap 75. A pilot piston 82 bears against the pilot extension 79 and is subjected to pressure at a pilot port 83. When the pressure at the port 83 is in excess of a predetermined value the spool valve number 72 will move against the force of the spring 73 to unlap a port 84 to pass pressure fluid into a line 86 to supply pressure fluid to operate the saw motor 34, the spent fluid from the saw motor being discharged by an exhaust line 87 to the reservoir or tank 41.

The mechanism thus far described, including the unloading valve 46 and the sequence valve 68, is under the control of a control valve indicated generally by the reference numeral 90. The control valve 90 includes a valve body 91 having a cylindrical bore 92 therein. A valve plunger 93 is slidable within the bore 92 and has a spool portion 94 of reduced diameter, the lengthwise dimension of which is defined by spaced lands 96 and 97. The plunger 93 also has a spool portion 98 of reduced diameter contiguous to the spool portion 94, the lengthwise dimension of which is defined by the land 97 and a land 99.

The valve body 91 is provided with a plurality of ports which are spaced longitudinally of the bore 92. The valve body 91 thus has an annular pressure port 101 which is connected to the line 47 back to the unloading valve 46. An annular port 102 intersects the bore 92 and is spaced from pressure port 101 and to the right thereof, and is connected to line 23, which in turn is connected with a flow regulator valve 103 to the cylinder head end of the saw guard cylinder 17. An annular port 104 intersects the bore 92 to the right of annular port 102, and is connected by a line 106 to the pilot port 83 of the sequence valve 68.

As seen in several figures, the bore 92 is also intersected by an annular port 107, located to the left of the pressure port 101, and connected by a pressure line 108 to a flow regulator valve 109, the flow regulator valve 109 being connected to the line 22 to the piston rod end of the saw guard cylinder 17. A pressure passageway 111 connects with the pressure port 107 and in turn is connected to pressure line 33, there being a flow regulator valve 112 connected in the line 33 between the valve 90 and the piston head end of the saw feed cylinder 32.

A saw feed control valve, referred to generally by the reference numeral 115, is mounted to the under side of the valve body 91 in any convenient fashion, and includes a valve body 116 having a cylindrical bore 117 therein. A valve member 118 is movable within the bore 117 and is subjected at one end thereof to the pressure in the annular port 104 of the valve body 91, there being a pressure passageway 119 in the valve body 91 which is in alignment with a passageway 121 in the valve body 116, the pressure passageway 121 being intersected by a pressure passage 122 connecting with a pressure chamber 123 at the end of the valve body 116. An adjustable abutment 124 is located within the pressure chamber 123, and is provided with a stop 126 at times contacting one end of the valve member 118, the position of the abutment 124 and the stop 126 being adjusted by a threaded member 127 threadedly engaged with an end cap 125 for the valve body 116 and locked in position by a nut 128. The pressure obtaining in the passageway 122 and the chamber 123 is effective to move the valve member 118 to the left, such movement being opposed by a spring 129 confined within a counterbore 130 of the valve body 116 and bottomed at one end against a spring retainer 131 supported on the left end of the valve member 118, the other end of the spring abutting an end cap 132 at the other end of the valve body 116, the spring 129 being maintained in proper alignment by means of a guide pin 133 formed integrally with the end cap 132.

The valve body 116 has an annular port 134 which is in alignment with the pressure passageway 121, and the bore 117 has a port 136 spaced a slight distance from the annular port 134. The port 136 is connected to the pressure line 35, which is connected to piston rod end of the saw feed cylinder 32. The valve member 118 has a tapered portion 137 which partially laps the annular port 134, to restrict the passage of fluid from the passageways 119, 121 past the annular port 134 and out the port 136, the degree of such restriction being in accordance with the pressure against the right end of the valve member 118.

Referring back to the valve 90, the valve body 91 thereof also is provided with an annular port 138 which is connected to a tank passageway 139. Any fluid bleeding past the valve member 118 is enabled to move from the counterbore 130 housing the spring 129 by way of a passageway 135 to the tank passageway 139.

An end cap 141 is held to the end valve body 91 by socket head screws 142, and encloses a return spring 143 encircling the valve plunger 93, the return spring 143 at times being compressed between the left end of the valve body 91 and a collar 140 held to the end of the valve member 93 by means of a C-clamping ring 144.

A passageway 146 is bored longitudinally of the valve plunger 93 and terminates at a point between the land 97 and the land 99, the passageway 146 being intersected by a passageway 145 which intersects the reduced diameter spool portion 98 between the lands 97 and 99. Similar passageways 148, 149 and 151 are spaced longitudinally of valve plunger 93 and intersect passageway 146, said passageways lying between the land 96 of the valve plunger 93 and a land 157 along a slightly reduced diameter portion 150 of the valve plunger 93, said passageways being in alignment with the annular tank port 139 seriatim under conditions as will be described.

The valve plunger 93 has an operating handle 155 so that the valve plunger 93 may be sequentially moved from the position seen in Fig. 1 to the position seen in Fig. 2, and then to the position seen in Fig. 3. The right end of the valve body 91 has secured thereto as by means of cap screws 156 a flanged member 157 having an annular extension 158 which surrounds the portion of the valve plunger 93 extending beyond the valve body 91. A sealing ring 159 is interposed between the end valve body 91 and the annular flange 157 to prevent the escape of pressure fluid from within the valve body 91. The annular extension 158 has a substantially Z-shaped slot 161 therein cooperating with a locking pin 162 extending transversely from the valve plunger 93. It will be seen with particular reference to Fig. 5 that the valve plunger 93 may be moved from position one shown, rotated a slight amount and locked in position two shown, and then moved translatively to position three, the movement from position two to position three being accomplished against the force of the return spring 143.

"Feel" is given to the operator actuating the valve plunger 93 in moving same from the position seen in Fig. 1 to the position seen in Fig. 2 and then to the position seen in Fig. 3, such feel being accomplished by a detent pin 163 biased by a detent spring 164, the detent pin 163 and the detent spring 164 being held in a detent recess 166 in the valve body 91. The valve plunger 93 is provided with a pair of spaced annular detent slots 167 and 168 which are engaged successively by the detent pin 163 as the valve plunger 93 is moved successively from the position shown in Fig. 1 to the position shown in Fig. 2.

The operation of the apparatus thus far described is as follows:

Consider the case when it is desired to raise the saw guard 12 and retract the chain saw 26. It will be assumed that pump 38 is being driven from a suitable power source. Under this condition pressure will be available at the annular pressure port 101 of the control valve 90, and will be available past the reduced diameter spool portion 94 to the annular port 107. The pressure in the line 108 connected to the annular port 107 is available past the flow regulator valve 109 by the way of line 22 to the saw guard cylinder 17 at the piston rod end thereof. The opposite end of cylinder 17 is connected to tank 41 by means of the line 23 which is connected to the annular port 102. Annular port 102 is connected to tank through the passageways 145, 146 and 151 in the valve plunger 93. It will be seen that a differential pressure will thus be maintained across the piston 21 to raise the saw guard 12 away from the saw bench 24.

The fluid under pressure available at the pressure port 101 is also available in the line 33, line 33 being connected by the passageway 111 to the annular port 107. The available pressure will thus be directed past the flow regulator valve 112 against the head end of piston 31 of the saw feed cylinder 32. The line 35 connected to the piston rod end of the cylinder 32 is connected to tank 41, the circuit thereto including ports 136 and 134 in the valve body 116, the passageways 119 and 121, and then by the way of passageways 145, 146 and 151 of the valve plunger 93, passageway 151 being in alignment with the tank port 139. It will be seen that a differential pressure is maintained across the piston 31 from the cylinder 32 to rock the rock arm 28 in a counterclockwise direction, thus retracting the saw from the saw bench 15.

The pressure obtaining for performing the functions thus far described is kept to a minimum in order to minimize the wear on the pump 38, and to this end the unloading valve 46 is pilot operated to unload excess pressure from the pump 38. A line 110 branches from the line 108 supplying the saw guard cylinder 17, and is connected at the pilot port 64 of the unloading valve 46. By way of example, when the pressure at the port 64 reaches a value of the order of 150 p. s. i., the spool valve member 52 of the pilot valve 46 is moved against the load in spring 54 to cause the excess fluid to be discharged to the tank port 66.

The flow regulating valves 103 and 109 connected respectively in the pressure lines 23 and 22 to the operating cylinder 17 are so arranged that the movement of the piston 21 will be a smooth one, and so that the saw guard 12 will be raised slowly as desired according to the setting of said flow regulating valves. The precise forms of said flow regulating valves are no part of the invention herein and any commercially suitable valve may be employed in this system.

Similarly, the flow regulating valve 112 connected in the line 33, and the throttling tapered portion 137 of the valve plunger 118 of the saw feed control valve 115 are effective to regulate the speed of movement of the piston 31 in the saw feed cylinder 32, so that the saw 26 may be advanced at any desired rate.

Consider now the operation obtaining for lowering of the saw guard 12 into position clamping work piece 11 against the saw bench 15. In order to accomplish such functioning of the saw guard 12 the valve plunger 93 is moved to position two seen in Fig. 2. Under this condition of the valve plunger 93 pressure at the port 101 is maintained in accordance with the setting of the unloading valve 46 and is now made available at the port 102 and the line 23 connecting with the saw guard cylinder 17 at the cylinder head end thereof. Line 22, however, at the piston rod end of cylinder 17 is directly connected to port 107, which is at the same pressure as the port 101. A differential pressure will be thus maintained across the piston 21, said differential being created by the cross-sectional area of the piston rod 16, and the differential pressure will be of opposite sense as compared with the pressure obtained when the valve 90 is in the position seen in Fig. 1. The differential pressure across the piston 21 under this latter condition will move the piston 21 to the right and thus lower saw guard 12 into position against the timber 11.

The condition of the saw feed cylinder 32 holding the saw 26 in retracted position will remain unchanged since the line 33 continues to be maintained at the pressure as determined by the valve 46, the piston rod end of the cylinder 32 being continued to be connected to the tank 41 by the fluid circuit previously described with respect to the position in Fig. 1 of the control valve 90.

When it is desired to operate the saw motor 34 and the saw 26 and to effect reversal in direction of the piston 31 to raise the saw 26 into contact with the timber 11, the control valve plunger 93 is moved to position three seen in Figs. 3 and 5. When the valve plunger 93 is moved to the position seen in Fig. 3, pressure at port 101 is made available also at the annular ports 102 and 104. Meanwhile port 107 will have been connected to tank, and the lines 108 and 22 will likewise be connected to tank.

Pressure available at port 102 is available also in the line 23 to continue to urge the piston 21 of the saw guard cylinder 17 to the right to maintain the saw guard 12 in position against the work piece 11.

However, since the port 107 is now connected to the tank port 138, the pressure in the line 110 branching from the line 108 will also be at tank pressure thereby relieving pressure against the pilot piston 63 to move the spool valve 52 under the urgence of the spring 54 to the position as seen in Fig. 1. The sequence valve 68 now becomes operable to discharge fluid into the line 86 to supply the saw motor 34 with pressure fluid. The pressure at the port 101 is available at the pilot valve port 104 and line 106 and against the pilot piston 82. When the pressure at the port 83 at the sequence valve 68 reaches a pressure, for example, of the order of 200 p. s. i. the spool valve 72 thereof will move against the urgence of spring 73 to spill fluid from the line 67 to the port 84 and the line 86 supplying the motor 34.

The same pressure at the port 101 is available in the pressure passageways 119 and 121, and the pressure fluid moves past the tapered portion 137 of the valve member 118 to supply pressure fluid in the line 35 and move the piston 31 to the left to rock the arm 28 and the saw 26 in a clockwise direction against the work piece 11. It will be remembered that line 33 connected to opposite end of the cylinder 32 is connected to the port 107 by the passageway 111, which port is now at tank pressure as has been previously explained.

The pressure at the port 104 may rise to a value as determined by the setting of the relief valve 43, and the full pressure as determined by the setting of the relief valve 43 is available to both the saw motor 34 and the saw feed cylinder 32 for the saw 26.

However, the pressure fluid for operating the saw feed cylinder 32 is metered at a rate in accordance with the resistance encountered by the saw 26 in sawing through the work piece 11. The resistance encountered creates an increase in working pressure against the saw motor 34. This increase in pressure manifests itself in the line 86 back through the sequence valve 68 and into the line 47 to the control valve 90. The pressure at port 101 thereof is likewise increased, as is the pressure in the port 104 and the pressure passageways 119 and 121 to the tapered portion 137 of the valve member 118 of saw feed control valve 115. The same pressure is available in the passageway 122 intersecting the pressure passageway 121 and communicating with the chamber 123. The pressure in chamber 123 is then effective to move the valve member 118 against the force of spring 129. The tapered portion 137 of valve member 118 will then throttle the pressure fluid to the port 136 and to the line 35 connected to the piston rod end of the saw feed cylinder 32.

The throttling of the pressure fluid to the saw feed cylinder 32 thus retards the feeding action thereof, and at the same time enables the saw motor 34 to come back up to proper working speed. Upon resumption of proper speed, the back pressure in lines 86 and 47 will decrease and the throttling effect of the valve member 118 will no longer obtain. The valve member 118 will then, of course, be moved to the right by the force of the return spring 129, and full pressure fluid is once more made available in the line 35 to the saw feed cylinder 32.

The increase in pressure in lines 86 and 47 occasioned by the resistance encountered by the saw 26 also is effective to make the saw guard 12 clamp the work piece with greater effort. Such increase of pressure is made effective at the port 102 and in the line 23 to the cylinder head end of the saw guard operating cylinder 17.

It may be remembered that during the operations just described for position three of the control valve 90 that line 33 connecting the piston head end of saw feed cylinder 32, and line 22 connecting the piston rod end of saw guard cylinder 17 remain at tank pressure, being connected respectively to the port 138 and port 107 which are connected around the reduced diameter 150 of the valve plunger 93 to the tank port 138.

The plunger 93 in position three as seen in Fig. 3 is moved to such position against the force of spring 143. Upon release of the operating handle 155 the plunger is returned to position two seen in Fig. 2, the locking pin 162 being at such time in the position as best shown in Fig. 5.

Upon such return of the plunger to position two, the saw feed cylinder 32 will retract the saw 26, the differential pressure across the piston 31 of cylinder 32 being effective to move piston 31 to the right. Line 35 will be at tank pressure, ports 136 and 134 and passageways 119 and 121 being connected by passageways 145, 146 and 149 to tank. Line 33 to the cylinder head end of cylinder 32 will be at the no load back pressure from pump 38, pressure port 101 being connected by passageway 111 and port 138 to the line 33.

Port 104, being connected to tank in this second position of valve plunger 93, will cause line 106 to drop to tank pressure thus closing port 84 of sequence valve 68 to the saw motor 34.

Return to position one is accomplished by turning the operating handle 155 and valve plunger 93 in the bayonet slot 161 and the moving of the plunger 93 translatively to position one seen in Figs. 1 and 5. Under such condition in the guard 12 will be raised, the saw at the same time being retracted as previously described with reference to position one of the valve plunger 93.

From the foregoing description it will be apparent that there has been provided a new and different control system for a timbering machine. According to the invention, only the no load back pressure is necessary to operate the saw guard and maintain the saw in retracted position. The circuit of the present invention is especially efficient since it requires the pump to operate at high pressure only during the operation of sawing.

While the invention has been described in terms of a preferred embodiment thereof it is not intended that the invention be limited by the embodiment shown herein, and only by the terms of the claims here appended.

I claim:

1. In a control system for fluid operated devices including a pump for supplying fluid under pressure, a first operable fluid motor, a second fluid motor which is operable after said first motor, a third fluid motor arranged to advance or retract said second fluid motor, a control valve connected in a fluid circuit to the output of said pump and in circuit with said motors to cause said first motor to operate to a first position in a first position of said control valve and to cause said first motor to move to a second position in a second position of said control valve, said control valve in the second position thereof causing said second motor to remain in its initial position, a fluid circuit including said control valve and said motors for maintaining the back pressure on said pump at a minimum, an unloading valve connected between said control valve and the output of said pump and movable to an unloading position during operation of said control valve to first and second positions so as to maintain the back pressure on said pump at a minimum, additional valve means operable upon movement of said control valve to a third position to supply fluid under pump pressure to said second fluid motor, and a fluid circuit operable upon movement of said control valve to a third position to cause said unloading valve to move to loading position to provide maximum differential pressure across said third motor, and a further fluid circuit for causing said additional valve means to be operable during the third position of said control valve to connect the output of said pump to said second motor.

2. A control system according to claim 1 wherein said unloading valve is provided with means responsive to the no load back pressure against said pump and said first and third motors in the first and second positions of said control valve for maintaining said unloading valve in the unloading position thereof.

3. A control system according to claim 2 wherein the operating means for said unloading valve is connected to exhaust upon movement of said control valve to the third position, to cause said unloading valve to move to the third position thereof.

4. A control system according to claim 3 wherein said additional valve means is provided with operating means therefor responsive to the pressure from said pump when said unloading valve is in the loading position thereof.

5. A control system according to claim 1 wherein said additional valve means is provided with operating means therefor responsive to the pressure from said pump when said control valve is in the third position thereof.

6. In a control system for fluid operated devices including a pump for supplying fluid under pressure, a first operable fluid motor, a second fluid motor which is operable after said first motor, a third fluid motor arranged to advance or retract said second fluid motor, a control valve connected in a fluid circuit to the output of said pump and in circuit with said motors to cause said first motor to operate to a first position in a first position of said control valve and to cause said first motor to move to a second position in a second position of said control valve, said control valve in the second position there of causing said second motor to remain in its initial position, a fluid circuit including said control valve and said motors for maintaining the back pressure on said pump at a minimum, valve means connected between said control valve and the output of said pump and movable to a position during operation of said control valve to first and second positions so as to maintain the back pressure on said pump at a minimum, additional valve means operable upon movement of said control valve to a third position to supply fluid under pump pressure to said second fluid motor, and a fluid circuit operable upon movement of said valve to a third position to supply fluid under pump pressure to said second fluid motor, and a fluid circuit operable upon movement of said valve to a third position to cause said first named valve means to move to a position to provide maximum differential pressure across said third motor, a further fluid circuit for causing said additional valve means to be operable during the third position of said control valve to connect the output of said pump to said second motor, and means responsive to the variation in pressure against said second fluid motor for varying the movement of said third fluid motor.

References Cited in the file of this patent
UNITED STATES PATENTS

| | | |
|---|---|---|
| 2,301,028 | Esch | Nov. 3, 1942 |
| 2,368,138 | Hayden | Jan. 30, 1945 |
| 2,446,397 | Welte | Aug. 3, 1948 |
| 2,511,563 | Bullard | June 13, 1950 |